(No Model.)

E. L. PHIPPS.
DOOR KNOB ATTACHMENT.

No. 284,893. Patented Sept. 11, 1883.

WITNESSES
Samuel E. Thomas
Wm. E. Hoit

INVENTOR,
Edward L. Phipps
by W. W. Leggett
Attorney

N. PETERS. Photo-Lithographer, Washington, D. C.

UNITED STATES PATENT OFFICE.

EDWARD L. PHIPPS, OF MILFORD, MICHIGAN.

DOOR-KNOB ATTACHMENT.

SPECIFICATION forming part of Letters Patent No. 284,893, dated September 11, 1883.

Application filed April 24, 1882. (No model.)

*To all whom it may concern:*

Be it known that I, EDWARD L. PHIPPS, of Milford, county of Oakland, State of Michigan, have invented a new and useful Improvement in Door-Knobs; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claims.

Figure 1:
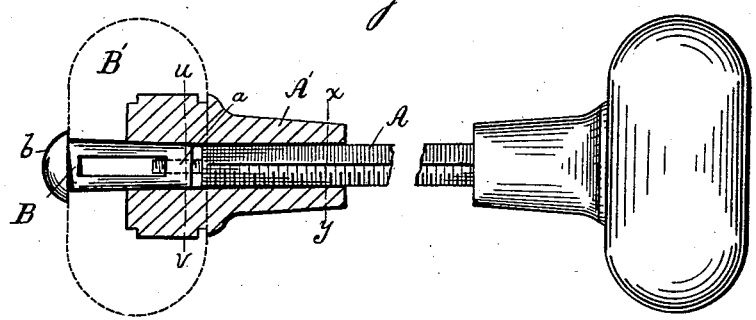
Figure 2:
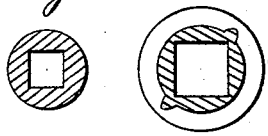
Figure 3:
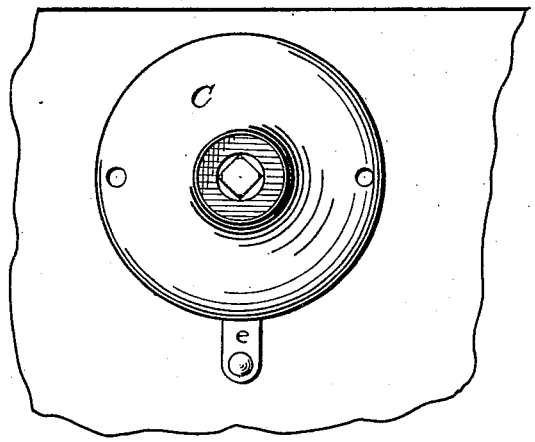
Figure 4:
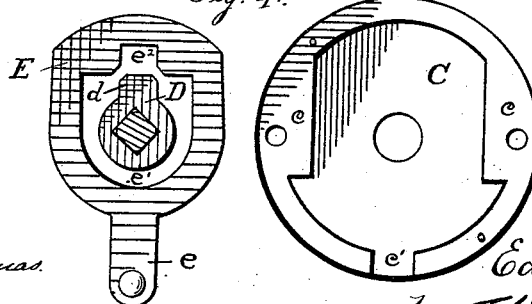

In the drawings, Figure 1 is a side elevation of my improved knob attachment, with one of the knobs and sleeves indicated in dotted lines and sectional view. Fig. 2 represents sectional views of the sleeve along the lines $x\ y$ and $u\ v$. Fig. 3 is an end view of my locking device with the knob and sleeve removed. Fig. 4 represents separate views of the locking mechanism when out of gear.

Hitherto in the construction of door-knob attachments it has been customary to provide a separate locking mechanism, and to attach the knobs to the spindle by means of a screw which is exposed on the outside of the door, which can be easily removed.

It is the object of my invention, first, to provide means for locking the spindle so that it cannot be turned in the door, and the bolt therefore remains engaged with its catch, dispensing with the need of an extra lock; second, to provide means for securing the outer knob to the spindle in such a manner that it cannot be removed from the outside, the spindle displaced with its locking mechanism, and another spindle inserted, whereby the bolt may be withdrawn from its engagement.

In carrying out my invention, A is a square spindle screw-cut on its outer end, as shown at $a$.

A' is a sleeve provided at one extremity with a square orifice suited to receive the square spindle, and with an angular cavity at its other end for the reception of an angular nut. (Shown in Fig. 2.)

B is an elongated angular nut adapted to be slipped longitudinally within the knob B' and sleeve A', and provided with an outer head, $b$, and screw-tapped on its inner end, whereby it is adapted to engage with the screw-cut end of the spindle $a$, the construction being such that when the rectangular nut is engaged within the knob and sleeve and with the screw-cut end of the spindle any removal of the knob and spindle from the outside is effectually prevented. In putting the parts together the elongated nut is first screwed to the proper adjustment upon the spindle, as shown, and the opposite end of the spindle is then passed through the knob and sleeve, and the angular elongated nut drawn into the angular cavity in the end of the sleeve, the head of said nut resting against the knob. The spindle is then passed through the latch-casing from the outside, and the inner knob may be secured thereto in any ordinary manner. To lock the spindle so that it cannot be turned in the door, the rose C is provided on its interior with the shoulders $c$. The flange is also cut away, as shown at $c'$, to inclose the stem of the slide $e$.

D is a locking-washer constructed with a square orifice and fitting closely upon the spindle. Said washer is provided with an arm, $d$.

E is a slide having straight edges arranged to play between and against the shoulders $c$ in the interior of the rose C. Said slide is provided with the stem $e$ and open center $e'$, adapted to revolve freely about the washer D when out of engagement therewith, and a socket, $e^2$, adapted to engage with the arm $d$ on the washer D. It is evident that when the stem $e$ is pulled out the slide is brought into engagement with the washer D and the spindle is locked, and vice versa.

Heretofore various contrivances have been employed for locking and unlocking the spindles of door-knobs—as, for example, a plate has been arranged to slide in a recess in the rose, such plate having a slot between its edges, through which the spindle passes, said slot being constructed to engage the spindle to lock the same against rotation. I do not, therefore, broadly claim a sliding plate for locking the spindle; but

What I claim is—

1. In a door-knob attachment, the combination, with the knob-sleeve having an angular spindle-orifice and an angular cavity at the end of said orifice, of the angular spindle screw-cut on its outer end, and extending through the orifice of the sleeve and into the cavity thereof, and the angular nut fitting in said cavity and engaged with the screw-cut end of the spindle, the nut and cavity having such relative dimensions that the said nut will be prevented from turning by the wall of the cavity, substantially as described.

2. In a device for locking knob-spindles, the combination of the hollow or chambered rosette comprising a base-plate having vertical shoulders or faces and bottom opening, and a face-plate detachably secured to said base-plate, the sliding plate or yoke fitted within said rosette, having an aperture in its body provided with a notched top edge, and a bottom stem passing through the opening in the rosette, and a collar on the knob-spindle, encompassed by the yoke or slide and provided with a projection or lug, as and for the purpose herein set forth.

In testimony whereof I sign this specification in the presence of two witnesses.

EDWARD L. PHIPPS.

Witnesses:
WALTER CRAWFORD,
JAMES G. PADLEY.